(12) United States Patent
Jitsukata et al.

(10) Patent No.: US 6,343,247 B2
(45) Date of Patent: *Jan. 29, 2002

(54) AUTOMATIC DRIVE CONTROL SYSTEM

(75) Inventors: Eishi Jitsukata; Sachio Kobayashi; Kazuya Tamura, all of Wako (JP)

(73) Assignee: Honda Giken Kogyo Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/134,522

(22) Filed: Aug. 14, 1998

(30) Foreign Application Priority Data

Sep. 1, 1997 (JP) ............................................. 9-236177

(51) Int. Cl.[7] .............................. G01C 22/00; G05D 1/00
(52) U.S. Cl. .............................. 701/28; 701/23; 701/25; 701/208; 701/213; 701/301; 340/903; 340/436; 180/168; 382/104; 348/119
(58) Field of Search .............................. 701/23, 24, 25, 701/28, 300, 301, 41, 36, 117–119, 207, 213; 180/167, 168, 169; 340/937, 435, 436, 901–905, 988–993; 348/418, 119, 113; 382/104, 103, 168, 199, 153; 318/587

(56) References Cited

U.S. PATENT DOCUMENTS

| 5,081,585 A | * | 1/1992 | Kurami et al. ................. 701/23 |
| 5,208,750 A | * | 5/1993 | Kurami et al. ................. 701/23 |
| 5,229,941 A | * | 7/1993 | Hattori ........................ 701/23 |
| 5,295,551 A | * | 3/1994 | Sukonick .................... 180/197 |
| 5,307,419 A | * | 4/1994 | Tsujino et al. ................. 382/1 |
| 5,467,284 A | * | 11/1995 | Yoshioka et al. ........... 701/301 |
| 5,479,173 A | * | 12/1995 | Yoshioka et al. ........... 701/300 |
| 5,483,453 A | * | 1/1996 | Uemura et al. ............... 701/23 |
| 5,504,482 A | * | 4/1996 | Schreder ..................... 340/995 |
| 5,617,085 A | * | 4/1997 | Tsutsumi et al. ........... 340/903 |
| 5,739,848 A | * | 4/1998 | Shimoura et al. ............. 701/28 |
| 5,764,139 A | * | 6/1998 | Nojima et al. ................. 701/1 |
| 5,781,119 A | * | 7/1998 | Yamashita et al. .......... 340/903 |
| 5,790,403 A | * | 8/1998 | Nakayama .................... 701/25 |
| 5,828,968 A | * | 10/1998 | Iiboshi et al. ................. 701/23 |
| 5,839,086 A | * | 11/1998 | Hirano ........................ 701/201 |
| 5,908,464 A | * | 6/1999 | Kishigami et al. .......... 701/208 |
| 5,911,773 A | * | 6/1999 | Mutsuga et al. ............. 701/200 |
| 5,926,117 A | * | 7/1999 | Gunji et al. ................. 340/988 |
| 5,950,161 A | * | 9/1999 | Kozuma et al. ............. 704/260 |
| 5,983,161 A | * | 11/1999 | Lemelson et al. .......... 701/301 |
| 6,032,097 A | * | 2/2000 | Iihoshi et al. ................. 701/96 |
| 6,032,098 A | * | 2/2000 | Takahashi et al. .......... 701/210 |

* cited by examiner

Primary Examiner—Jacques H. Louis-Jacques
(74) Attorney, Agent, or Firm—Arent Fox Kintner Plotkin & Kahn, PLLC

(57) ABSTRACT

In an automatic drive control system in a road environment in which an infrastructure has been constructed so as to automatically steer a vehicle, the automatic steering of the vehicle is performed irrespective of lane markers attached on the road surface. A running command and a running course are determined on the basis of an obstacle detection signal, a vehicle position signal, road data, and traffic information signal for automatic driving. A target running locus is obtained on the basis of the set running course. The vehicle is automatically steered so as to trace and run along the obtained running target locus.

1 Claim, 4 Drawing Sheets

AUTOMATIC DRIVE CONTROL SYSTEM

BACKGROUND OF THE INVENTION

1. Field of the Invention

The invention relates to an automatic drive control system.

2. Description of the Related Art

Hitherto, there has been known an automatic drive control system for a vehicle such as an automobile, in which a train of lane markers such as magnetic nails or the like provided on the road surface is used as a reference line and signals which are generated from the lane markers are detected, thereby recognizing a relative position of the vehicle with respect to the reference line and automatically steering the vehicle so as to adjust the center line of the vehicle along the reference line.

As a prior art, for example, there is a system disclosed in Japanese Patent Kokai 9-62346. This system comprises: a navigation apparatus for detecting a position of a vehicle carrying the navigation apparatus by using not only signals which are generated because of the magnetic nails but also signals from the global positioning system (GPS); and a communicating apparatus which can receive various traffic information from beacons provided at every predetermined intervals on the sides of the road. In this system, a running line is set along the reference line in accordance with the running environment and the vehicle is steered along the set running line.

In order to detect a running on a rut formed on the road, the system has a yaw rate sensor and a lateral acceleration sensor and detects a forming state of the rut by a camera mounted thereon, thereby setting the running line suitable for the road on which the vehicle is running.

In this system, the running line for the reference line can be made unspecified by changing a positional relation between the reference line and the center of the vehicle with the elapse of the time, thereby to prevent the formation of the rut.

In the conventional automatic steering system, however, the reference line is recognized by detecting the signals produced because of the magnetic nails on the road, and the automatic steering is performed so as to trace a desired running line. When, for example, positions of the magnetic nails 2 which are arranged in a center portion of a lane 1 of a road do not exist on a smooth curve along a curvature of the lane, as shown in FIG. 1A, a running line 3 which is set by tracing the nails does not draw a smooth curve around the center of the lane. In other words, a vehicle 4 is so steered that a straight line 5 connecting two adjacent magnetic nails coincides with the vehicle center line. When, therefore, the steering is performed so as to trace the magnetic nails 2 which are not correctly arranged on the center of the road as shown in FIG. 1A, the running line 3 of the vehicle has a zigzag form.

When the setting interval of the magnetic nails in the longitudinal direction of the road is wide, the recognition of the nails as a reference line is not stabilized, so that the vehicle is likely out of a desired course.

As disclosed in Japanese Patent Kokai 9-62346, in the method of changing the position of the vehicle relative to the reference line with the elapse of time, there has been a problem such that a predetermined running line is missing, since the change width is limited to a detecting range of magnetic nail signal detecting means provided for the vehicle and the movement of the vehicle exceeding the signal detecting range is necessary or occurs for the reference line for the purpose of, for example, avoidance of an obstacle.

SUMMARY AND OBJECTS OF THE INVENTION

It is, therefore, an object of the invention to provide an automatic drive control system for a motor vehicle, which can perform an automatic steering in accordance with a driving situation of the motor vehicle without limiting to only a tracing operation of marks such as magnetic nails or the like provided on a road.

According to the invention, there is provided an automatic drive control system for a motor vehicle, comprising: radar means for detecting an existence of an obstacle in front of a vehicle so as to produce an obstacle detection signal; photographing means for photographing a road surface in front of the vehicle so as to produce a video signal; image processing means for generating a vehicle position signal indicative of a position of the vehicle in the width direction of the road from an image represented by the video signal; a navigation apparatus for generating road data indicative of coordinates of the road in front of the current position of the vehicle; communicating means for receiving a traffic information signal for automatic driving; running command generating means for generating a running command; running course setting means for setting a running course on the basis of the running command, obstacle detection signal, vehicle position signal, road data, and traffic information signal for automatic driving; and target running locus calculating means for obtaining a target running locus on the basis of the set running course, wherein the vehicle is steered so as to trace the target running locus.

Since the vehicle sets the running course on the road where it is running, it is unnecessary to provide the lane markers such as magnetic nails or the like on the road surface and detecting the signals from the lane markers even for the automatic staring for the motor vehicle. Even in the running state of the vehicle such as lane change, branching, or junction in which the detection of the lane markers is interrupted (discontinued), smooth steering for the vehicle can be maintained.

DETAILED DESCRIPTION OF THE PREFERRED EMBODIMENT

An embodiment of the invention will now be described in detail hereinbelow with reference to the drawings.

Figure 2:
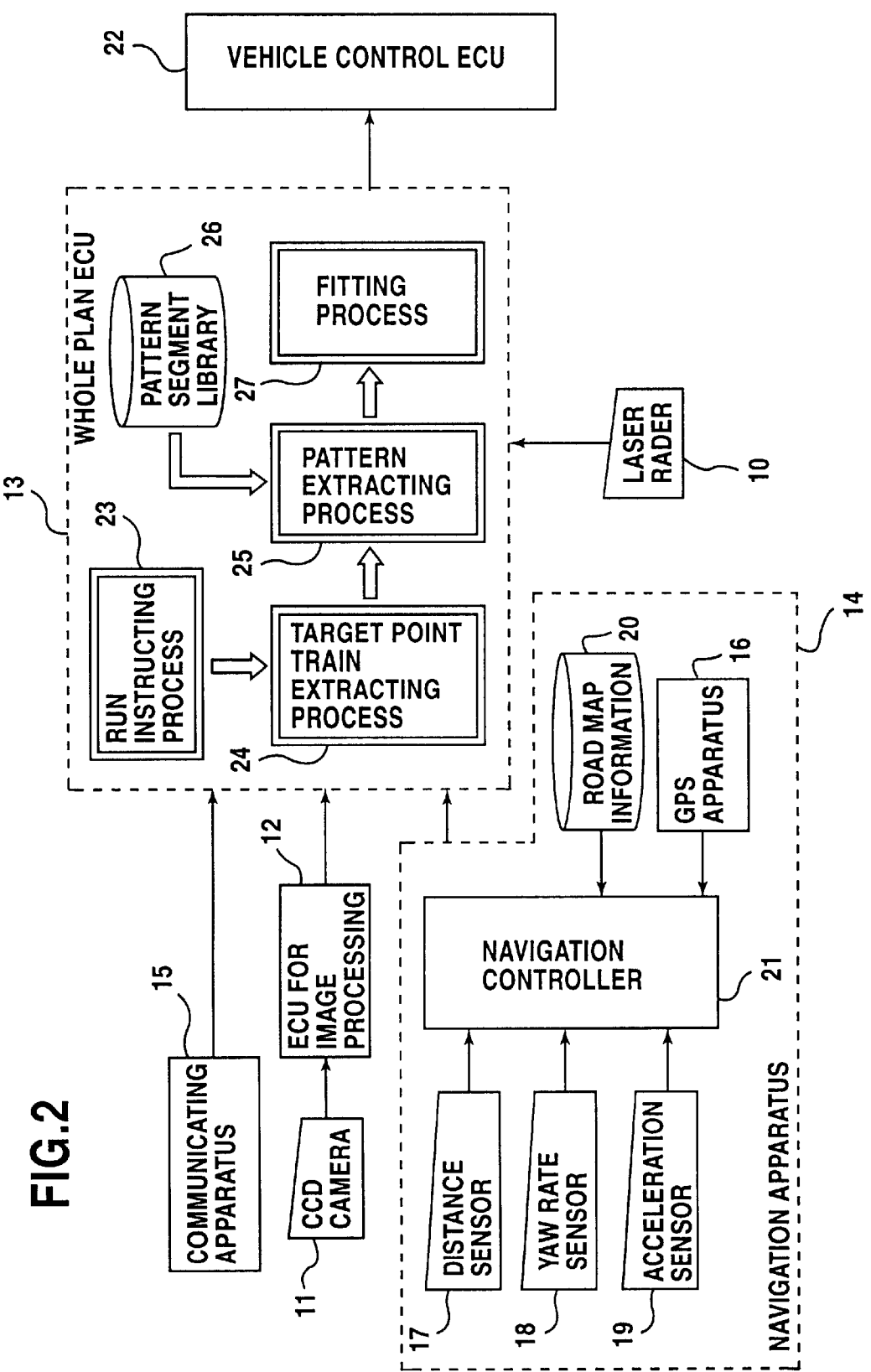
FIG. 2 is a block constructional diagram showing an embodiment of the invention.

FIG. 2 shows a block constructional diagram of an automatic drive control system as an embodiment of the invention. In the system, a laser radar 10 for detecting an existence of an obstacle located in front of a vehicle and a CCD (Charge Coupled Device) camera 11 serving as photographing means for recognizing a form of a road surface of the road in front of the vehicle and a positional relation between the own vehicle and a lane are provided for a front portion of the vehicle (not shown). A video signal obtained by the CCD camera 11 is supplied to an ECU (Electronic Control Unit) 12 for image processing. The ECU 12 is constructed by a microcomputer and generates road surface data and position data indicative of the own vehicle on the lane on the basis of the video signal from the CCD camera 11. Outputs of the laser radar 10 and ECU 12 for image processing are supplied to a whole plan ECU 13. Outputs of a navigation apparatus 14 and a communicating apparatus 15 are supplied to the whole plan ECU 13.

In this instance, as an infrastructure constituting the automatic running system, beacons controlled by a management center are provided at every predetermined intervals on the sides of the road. The communicating apparatus 15 receives traffic information signals for automatic driving from the beacons. The navigation apparatus 14 has: a GPS (Global Positioning System) apparatus 16; a distance sensor 17; a yaw rate sensor 18; an acceleration sensor 19; and road map information 20 in which road map data have been recorded. The navigation apparatus obtains running information by a navigation controller 21. Since the construction and operation of the navigation apparatus 14 have been well-known, they are not described in detail here.

The whole plan ECU 13 first decides running commands such as lane maintaining of the lane or lane change by a run instructing process 23 on the basis of information regarding the obstacle located in front of the vehicle from the laser radar 10 and road information or traffic information in a predetermined distance in front of the vehicle from the communicating apparatus 15. In this instance, by simultaneously referring to vehicle running information (direction, speed, acceleration, and the like) and map information from the navigation apparatus 14, more accurate running information can be obtained.

Figure 3:
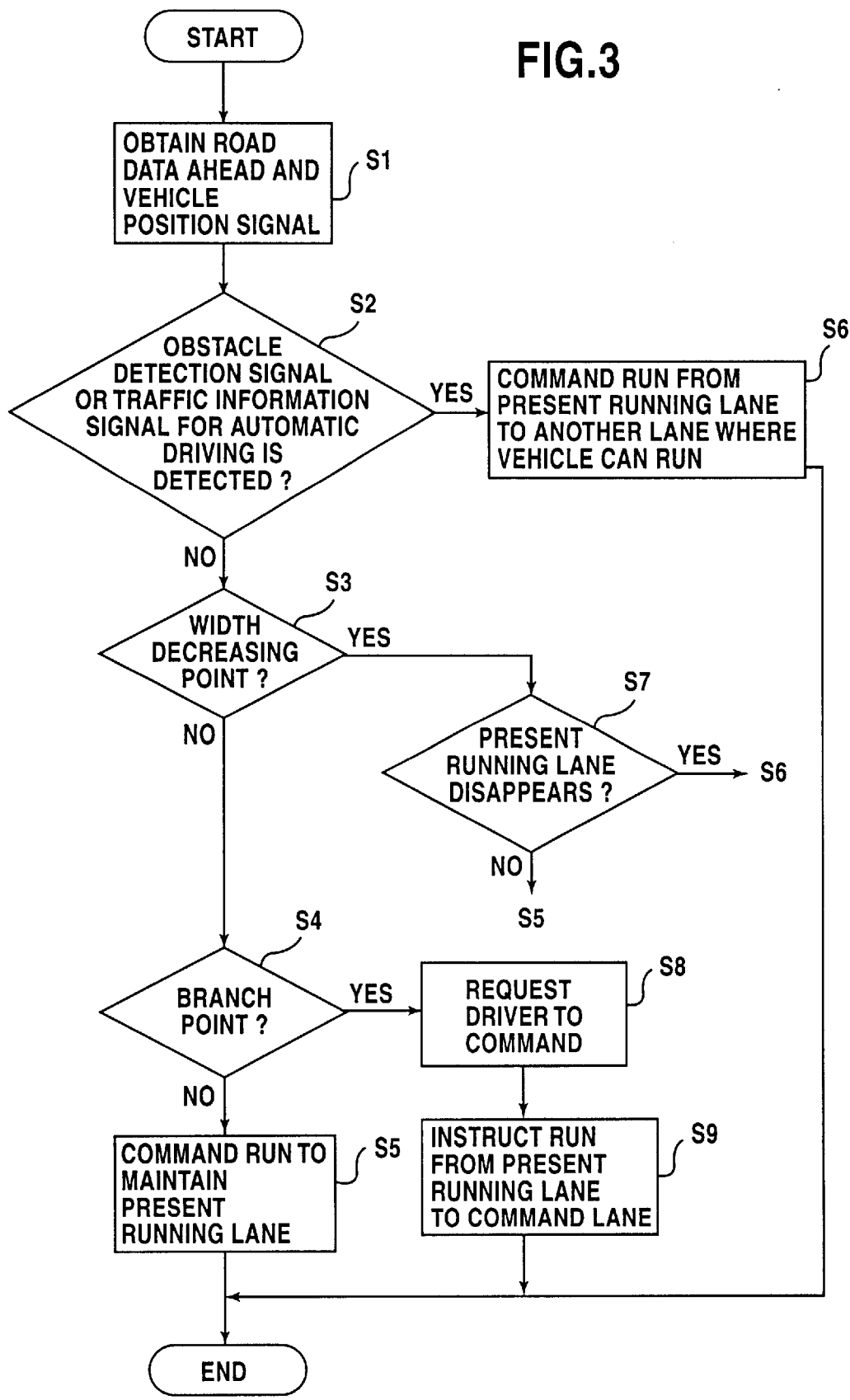
FIG. 3 is a flowchart for explaining a process for deciding a running command in a whole plan ECU in FIG. 2.

FIG. 3 is a flowchart showing an embodiment of a process for obtaining the running command in the whole plan ECU 13 according to the invention. In FIG. 3, road data in front (for example, 100 meters ahead) of the vehicle generated from the navigation apparatus 14 and a vehicle position signal from the ECU 12 for image processing are obtained (step S1). Road information is obtained for all of the areas where the vehicle may possibly visit from now on in the run from the current position of the vehicle. By detecting an obstacle in the obstacle detection signal obtained from the laser radar 10 or obtaining a signal indicative of, for example, the presence or absence of an accident, a position of the accident, and the like in the traffic information signal for automatic driving which is received by the communicating apparatus 15 (step S2), a command is issued for the run in a range from the current running lane to a lane where those obstacles or an accident can be avoided (step S6). In this obstacle detection, a vehicle which is running at a low speed in front of the own vehicle may be regarded as an obstacle in case the distance between both of the vehicles is narrow.

When, in step S2, no detection signal is detected, it is discriminated whether the running vehicle enters a road whose width decreases or not on the basis of the road data and vehicle position signal obtained in step S1 (step S3). When, in step S3, it is determined that the vehicle enters a width decreasing point of the road, a discrimination is made whether the current running lane disappears at the width decreasing point or not (step S7). When, in step S7, it is detemined that the current running lane will disappear, the operation in step S6 is executed. If NO in step S7, a command is issued for the run to keep the current running lane (step S5). When, in step S3, the width decreasing point is not confirmed, it is discriminated whether that point is a branching point or not (step S4). When the branching point is now confirmed, the driver is urged to instruct which lane the driver wants to run or whether he wants to keep the current running lane (step S8). There issued a command for the run in a range from the current running lane up to the lane pointed out by the driver (step S9). When, in step S4, the branching point is not confirmed, a command is issued for the run to keep the current running lane (step S5).

When the vehicle enters the junction, the lane is not changed and the running command in step S5 is executed.

When, as mentioned above, the running command is generated by the run command process 23, within an information range where the run instructing process 23 has decided the running command (for example, within a range of 100 meters ahead of the motor vehicle), information regarding the decided running command is further extracted. The position in the road width direction of the vehicle is obtained by the CCD camera 11. A point train serving as a running course in the information range in which the current vehicle position is set to a start point and the running target point is set to an end point is determined by a target point train extracting process 24. On the basis of the point train obtained by the target point train extracting process 24, a pattern extracting process 25 and a fitting process 27, which will be described hereinlater, are executed, so that a target running locus is determined. The whole plan ECU 13 transmits a vehicle steering signal based on the obtained target running locus to the vehicle control ECU 22. Since the construction and operation of the portion for obtaining the vehicle steering signal in accordance with the obtained target running locus are similar to those in the prior art as disclosed in Japanese Patent Kokai 9-62346, they are not described in detail here.

Figure 4:
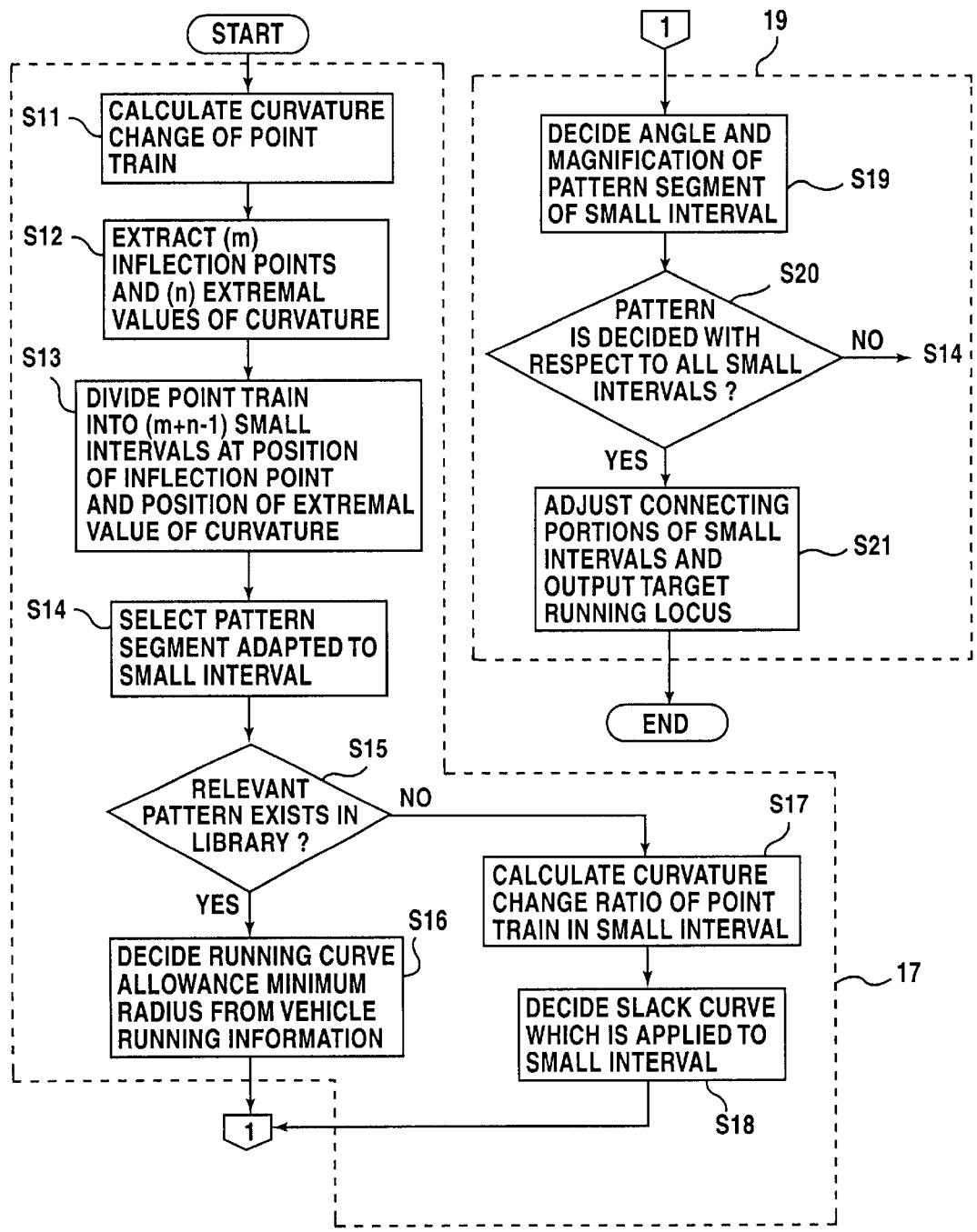
FIG. 4 is a flowchart for explaining a fitting process in the whole plan ECU in FIG. 2.

FIG. 4 is a flowchart for explaining an embodiment of the pattern extracting process 25 and fitting process 27 of the whole plan ECU 13 according to the invention. In FIG. 4, a curvature in each point train is first obtained by a calculation on the basis of the curve connecting the neighboring points extracted by the target point train extracting process 24 (step S11). From the result in step S11, (an n number of) extremal values of the curvature and (an m number of) inflection points of the curve are extracted (step S12). In the embodiment, a start point and an end point in the point train are included in the inflection points. Subsequently, the point train is divided into an (m+n−1) number of small segments on the basis of the result in step S12 (step S13). A pattern segment of the shape which is fitted into each small interval, namely, which is adapted thereto is selected from a pattern segment library 26 (step S14). The pattern segment library 26 is means for storing basic elements such as straight line, arc, and the like and road patterns such as U-shape, S-shape, right/left lane change, junction, branching, and the like formed by a combination of those basic elements. If, as a result of the process in step S14, the relevant pattern exists in the small interval (step S15), the minimum allowance radius of the curve where the vehicle can run is determined by the running information serving as a basis for deciding the running command. When the curve is included in the pattern segment selected in step S14, the shape of the pattern segment is finely adjusted so that the radius of curvature of the curve is equal to or larger than the minimum allowance radius (step S16). When, in step S15, the pattern segment of the shape adapted to the small interval does not exist, a change ratio of the curvature of the point train in the small interval is obtained by a calculation (step S17). A slack curve adapted to the small interval is determined (step S18). Step S18 relates to a process for obtaining an average curvature change of the point train by, for example, the method of least squares and deciding a parameter of clothoid (Cornu's spiral).

Subsequently, an angle and a magnification of the pattern segment selected in correspondence to the small interval are determined so as to be adapted to the actual running road (step S19). The above processes are performed for all of the small segments or intervals (step S20). The angle and magnification of each pattern segment are further finely adjusted and coupled so that the tangential directions in the coupling portions of the small intervals coincide, and a set target running locus is generated (step S21).

A vehicle steering signal is formed on the basis of the target running locus generated by the processes of the whole plan ECU 13 described above and the resultant vehicle steering signal is supplied to the vehicle control ECU 22. On the basis of the vehicle steering signal, the vehicle control ECU 22 generates control signals to be fed to a throttle actuator, a brake actuator, and a steering actuator (not shown), thereby automatically steering the vehicle.

Figure 1:
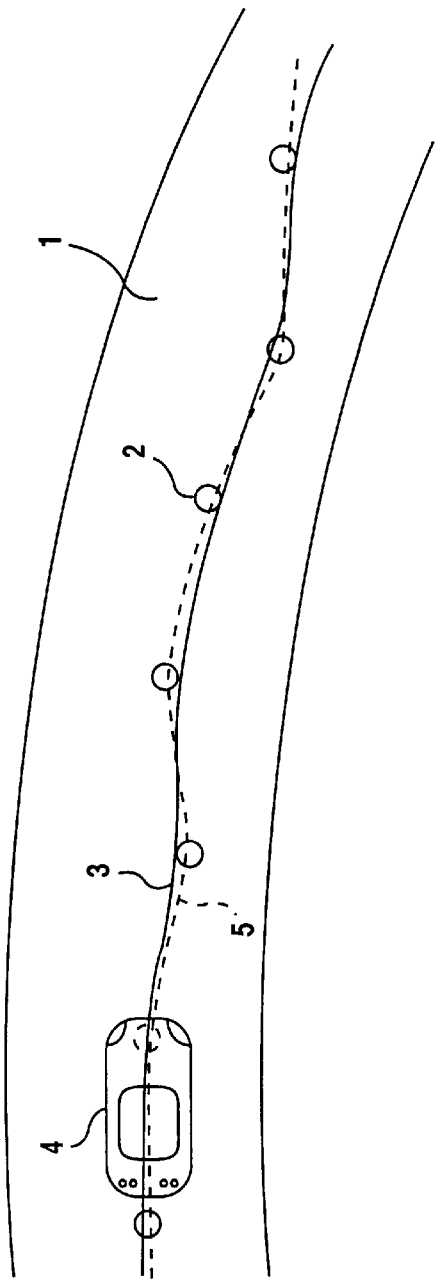
FIGS. 1A and 1B are diagrams showing target running loci of vehicles according to the prior art and the invention.

In this manner, a target running locus 8 is set by the whole plan ECU mentioned above into a vehicle 7 in which the automatic drive control system according to the invention. The vehicle 7 is steered so as to draw a smooth running locus in the center portion of a lane 6 of the road as shown in FIG. 1B.

In the run instructing process 23, it is also possible to provide means (not shown) for detecting a steering command by a manual operation from the driver and to decide a running command in accordance with it.

The laser radar 10, CCD camera 11, image processing ECU 12, communicating apparatus 15, run instructing process 23, and target point train extracting process 24 correspond to radar means, photographing means, image processing means, communicating means, running command forming means, and running course setting means, respectively. The pattern extracting process 25 and fitting process 27 correspond to target running locus calculating means.

As described above, according to the automatic drive control system of the present invention, the running course is set on the basis of the obstacle detection signal, vehicle position signal, road data, traffic information signal for automatic driving, and running command. The target running locus is obtain ed on the basis of the s et running course and the vehicle can be automatically steered so as to trace and run along the obtained target running locus. The automatic steering of the vehicle can be, therefore, performed irrespective of the lane markers such as magnetic nails or the like provided on the road surface.

Eve n in the case where there is a disorder in the arrangement of the lane markers or even in the running state such as lane change, branch, or junction such that the detection of the lane markers is interrupted, the smooth steering can be maintained.

What is claimed is:

1. An automatic drive control for automatically steering a vehicle, comprising:

radar means for detecting the existence of an obstacle in front of said vehicle and generating an obstacle detection signal;

photographing means for photographing a road in front of said vehicle and generating a video signal;

image processing means for generating a vehicle position signal showing a position of said vehicle in a road width direction from an image shown by said video signal;

a navigation apparatus including a global positioning system apparatus and a road map information source containing road map data, for generating road data showing coordinates of the road in front of a current position of said vehicle;

communicating means for receiving a traffic information signal for automatic driving issued from a stationary transmitter;

running command generating means for generating a running command;

running line establishing means for consecutively establishing an instantaneous running line with respect to the road map represented by said map data in response to said obstacle detection signal, said vehicle position signal, said road data, said traffic information signal for automatic driving, and said running command; and target running locus calculating means for consecutively determining a target instantaneous running locus on the basis of said established instantaneous running line; and steering means for steering said vehicle so as to trace and run along said instantaneous running locus thereby to avoid a dangerous situation of said vehicle.

* * * * *